United States Patent Office 3,053,636
Patented Sept. 11, 1962

3,053,636
BORON DEPOSITION METHOD
Kenneth E. Bean and William E. Medcalf, Miami, Okla., assignors to the United States of America as represented by the Secretary of the Army
No Drawing. Filed Nov. 10, 1960, Ser. No. 68,579
2 Claims. (Cl. 23—209)

This invention relates to a method for depositing boron on a tantalum filament.

An objective of the invention is to deposit boron on a tantalum filament in such a manner that the filament can be mechanically pulled from the deposit leaving the crystal bar intact and unbroken.

Another objective of this invention is to produce elemental boron of ultra-high purity. When using the ultra-pure boron prepared by the method of this invention as a starting material, it is possible to grow single crystals of boron from the deposited crystal bar by the floating zone technique.

The method of the invention involves the thermal decomposition of purified boron tribromide at temperatures ranging from 1125° C. to 1175° C. in a reducing atmosphere. Briefly, a reduction chamber containing a tantalum filament is out-gassed with hydrogen and then with helium. The filament is heated to 1200° C. in a helium atmosphere and allowed to stabilize thereat for 5 minutes. Hydrogen and boron tribromide gas are then introduced simultaneously into the reduction chamber. The temperature is stabilized at 1100° C. for 30 minutes; then increased to and stabilized at 1150° C. for 30 minutes while increasing the mole ratio of boron tribromide gas from about 6 mole percent to about 8 mole percent. The temperature is then raised to 1175° C.; the helium flow stopped; and the mole ratio of boron tribromide was increased to about 10 mole percent. The latter condition is then held for about 30 to 60 minutes.

One example of a hydrogen reduction unit for carrying out the invention employs a small diameter (.05") tantalum hairpin-type filament. The unit proper is composed of a halide boiler which is coupled to a reduction tube by means of semi-ball and socket joints. The boiler, reduction tube and ball and socket joints are all made of clear fused silica. The ball and socket joints are also ground to a vapor tight fit and require no lubricant or sealing compound, other than the ground joint fit. The halide boiler is fitted with two orifices which allow hydrogen to pass over the top of the boron tribromide or to bubble through the boron tribromide, or do both simultaneously. The reduction tube is sealed with Teflon coated rubber seals or solid Teflon seals. These seals are also protected by fused silica plates which baffle the halide away from the seals. The hydrogen and the entrained halide enter the unit through the side of the reactor near the bottom of the filament, pass upward along the hot media and exit near the top of the filament. The halide never contacts any material other than the hot filament or clear fused silica, which is at a relatively cool temperature, when it is in the unit.

In the method, deposition is started at about 1125° C. and with a relatively low mole ratio of boron tribromide to hydrogen; i.e., less than 6 mole percent. Under these conditions a dendritic, amorphous-like, low temperature alpha rhombohedral form of boron is deposited very quickly on the filament, which is protected by a tantalum diboride film. This tantalum diboride film is formed at the very beginning of the run by heating the tantalum filament to 1200° C. in helium for 5 minutes and then converting to boron tribromide and hydrogen simultaneously. The diboride film starts depositing at the bottom of the filament, i.e. the nearest part to the halide entrance, and rapidly moves up the filament to the top. As the tantalum diboride film is deposited, the apparent temperature (as measured by an optical pyrometer) over the deposited area drops rapidly to about 1050° C. As soon as the deposit is formed all the way up the filament, the temperature is stabilized at 1150° C. After 30 minutes at these conditions, the mole ratio of boron tribromide is increased to about 10 mole percent and the temperature is increased to a maximum of 1175° C. At these conditions, the boron deposits rapidly to form a ¼" diameter crystal bar in one to one and one-half hours. The molar concentration of ingredients and the times specified in this paragraph may be varied plus or minus 20 percent, and the temperatures may not be varied more than plus or minus 5 percent. The run must be stopped before the temperature of the inner layer of low temperature rhombohedral boron reaches the temperature at which it is converted to the high temperature rhombohedral form, i.e., about 1200° C. If the run is allowed to progress past this point, the boron crystal bars will not slip off of the tantalum substrate. By keeping the temperature below 1200° C. and substantially between 1125° C. and 1175° C., the crystal bar of spectrographically pure boron deposited by the aforementioned method is slipped from the tantalum filament intact leaving the tantalum diboride ring on the tantalum. In the case of low temperature runs, i.e., runs of less than 950° C., the deposition is very slow, and the deposit strips or peels itself away from the tantalum in this films. These conditions leave the tantalum exposed to the hydrogen, boron tribromide and hydrogen bromide atmosphere. Furthermore, no tantalum diboride layer is formed to protect the tantalum from further corrosion. In the case of high temperature runs, i.e., runs over 1200° C., the tantalum diboride forms an almost inseparable core in the boron deposit. Leaching in hot hydrofluoric acid is then required to remove the tantalum.

Another undesirable occurrence in temperature runs below 950° C., and above 1200° C. is the resulting contamination of the deposited boron. That is, impurities of magnesium iron, and tantalum are found by spectrographic analyses in boron deposited at these temperatures, whereas these impurities cannot be detected when the run is carried out at 1125° C. to 1175° C.

After the deposited crystal bar of boron is slipped from the tantalum filament, the crystal bar is float zoned to give it strength for utilization as a boron filament in future depositions or for any other use where massive high temperature beta rhombohedral boron is required.

The boron tribromide used in the invention can be readily synthesized by either bromination of boron carbide or elemental boron. The boron tribromide is then purified by fractional distillation and can be stored as a liquid at room temperature prior to use.

While there has been described what is at present a preferred embodiment of the invention, it will be obvious to those skilled in the art that various changes and modifications may be made therein without departing from the invention as herein claimed.

What is claimed is:
1. The method of depositing a low temperature alpha rhombohedral deposit of boron on a tantalum filament in such a manner that the filament can be mechanically pulled from the deposit leaving the deposited crystal bar intact and unbroken including the steps of (1) out gassing a reduction chamber containing the tantalum filament with hydrogen and then with helium, (2) heating the filament to about 1200° C. in a helium atmosphere and allowing to stabilize thereat, (3) simultaneously introducing hydrogen and boron tribromide vapor into the reduction chamber, (4) stabilizing the temperature at about 1100° C. for 24–34 minutes, (5) increasing to and then stabilizing the temperature at about 1150° C. for 24–34 minutes while increasing the mole ratio of boron tribromide vapor from about 4.8 to 7.2 mole percent up to about 6.4 to 9.6 mole percent, and (6) raising the temperature to about 1175° C. while stopping the helium flow, increasing the mole ratio of boron tribromide up to about 8 to 12 mole percent and holding under these conditions for from 24–34 minutes up to 48–72 minutes.

2. The method of depositing a low temperature alpha rhombohedral deposit of boron on a tantalum filament in such a manner that the filament can be mechanically pulled from the deposit having the deposited crystal bar intact and unbroken including the steps of (1) out gassing a reduction chamber containing the tantalum filament with hydrogen and then with helium, (2) heating the filament at 1200° C. in a helium atmosphere and allowing to stabilize thereat, (3) simultaneously introducing hydrogen and boron tribromide vapor into the reduction chamber, (4) stabilizing the temperature at 1100° C. for 30 minutes, (5) increasing to and then stabilizing the temperature at 1150° C. for 30 minutes while increasing the mole ratio of boron tribromide vapor from about 6 mole percent up to about 8 mole percent, and (6) raising the temperature to about 1175° C. while stopping the helium flow, increasing the mole ratio of boron tribromide up to about 10 mole percent and holding under these conditions for about 30 to 60 minutes.

References Cited in the file of this patent

UNITED STATES PATENTS

| | | |
|---|---|---|
| 699,232 | Potter | May 6, 1902 |
| 2,839,367 | Stern et al. | June 17, 1958 |
| 2,893,842 | Kroll | July 7, 1959 |
| 2,910,357 | Muller | Oct. 27, 1959 |